United States Patent [19]

Nagai

[11] 3,962,759
[45] June 15, 1976

[54] BAND CLAMPING DEVICE

[75] Inventor: Hiroshi Nagai, Tokyo, Japan

[73] Assignee: Kabushiki Kaisha Suda Seisakusho, Tokyo, Japan

[22] Filed: Mar. 20, 1975

[21] Appl. No.: 560,112

[30] Foreign Application Priority Data

May 13, 1974 Japan.................. 49-54252

[52] U.S. Cl. ................................. 24/269
[51] Int. Cl.² ..................................... B65D 63/00
[58] Field of Search................. 24/16 R, 19, 68 BT, 24/269; 248/309

[56] References Cited

UNITED STATES PATENTS

| 1,627,172 | 5/1927 | Gouirand et al. | 24/269 |
| 1,910,116 | 5/1933 | Malleville | 24/19 |
| 1,963,436 | 6/1934 | Dumke | 24/269 |
| 3,533,588 | 10/1970 | Cregier | 24/68 BT X |

FOREIGN PATENTS OR APPLICATIONS

| 942,009 | 9/1948 | France | 24/269 |
| 1,460,820 | 10/1966 | France | 24/269 |
| 771,264 | 3/1957 | United Kingdom | 24/269 |

Primary Examiner—Donald A. Griffin
Attorney, Agent, or Firm—Polster and Polster

[57] ABSTRACT

A band clamping device which is constructed with a U-shaped main body with the bottom part thereof constituting a seating member, and with both sides extending from the seating member in the form of a channel being made to constitute a pair of support members; a flexible band, one end of which is folded for being hooked at the seating member through at least one slot formed therein; a band take-up member provided in one part thereof with a band insertion slot and which is rotatably held by said pair of support members; a ratchet wheel which rotates integrally with the band take-up member and a return preventive mechanism to cause an engaging pawl provided on the support member to be engaged with the ratchet wheel, wherein the angle of bending of the support members is made greater than 90° with respect to the seating member thereby to relax the overriding resistance between the ratchet wheel and the engaging pawl formed on one part of one of the support members, and, simultaneously, the open width of the pair of support members is narrowed by compression against its elasticity to thereby release the engagement between the ratchet wheel and the engaging pawl.

4 Claims, 10 Drawing Figures

BAND CLAMPING DEVICE

BACKGROUND OF THE INVENTION

1. Field of the Invention

This invention relates to a device for clamping one object to another with a band, or, more particularly, it is concerned with a band clamping device which comprises a flexible band and a clamping means.

The band clamping device according to the present invention finds its use, for example, in attaching power cable, tubing for electric wire, and so forth along the lengthwise direction of a pole or mast so as to fix such wire materials to the pole, or in fixing a bracket for mounting thereon various devices and appliances for telecommunication and power supply, or advertising material, street lighting, and so forth on the pole.

The present invention is also useful in fixing the bracket for the abovementioned appliances and equipments for the telecommunication and power supply, or attaching various sign boards onto the pole or mast, either standing upright or being laid down, at various places such as, for example, railway stations, etc.. Or, in the case of temporary mounting of electric power supply appliances, sign board, etc. onto scaffolding pillar, piles, and so on, or in the case of fitting clamp metal for joining the intersecting parts of the abovementioned scaffolding pillars on each of them, or in the case of binding together a plurality of lengthy material such as lumbers, or in many other uses.

2. Descritption of Prior Arts

For such various uses as mentioned above, there has been known a band clamping device which comprises a flexible band and a clamping means, wherein the clamping means forms a bearing seat in the form of a channel in the rectangular seat plate to provide a band take-up shaft, and wherein the band to be clamped is wound around the pole, mast, scaffolding pillars, etc. (hereinafter referred to in general term as "pole"), and a bent portion at one end thereof is hooked at a hooking slot of the clamp member main body, and the other end is wound up on the take-up shaft and clamped firmly so as not to loosen.

SUMMARY OF THE INVENTION

It is therefore an object of the present invention to provide an improved band clamping device, wherein, by effecting the return preventive locking of the band take-up shaft after clamping of an object by the band in either automatic or simple one-touch operation, the band take-up shaft of the device is caused to stop at its right position for the clamping so as not to bring about any slackening of the band, and wherein the band take-up shaft can be easily released from its locked state at any time depending on necessity.

It is another object of the present invention to provide an improved band clamping device, wherein necessary clamping force can still be maintained even when the object bodies bundled by such band clamping device become thin with lapse of time.

For the main body of the flexible band tightening device, there are used various kinds of metal materials, synthetic resins such as, for example, nylon, polypropyrene, and so forth. In particular, for the area where injury to metal articles by sea breeze is considerable, non-rustrous steel material such as stainless steel is required to be used. In this case, the band take-up shaft of a structure, wherein a band insertion slot is formed on a conventional bolt, is too expensive to be suitable for practical uses. It is therefore the object of the present invention to manufacture the band take-up shaft of rust-proof material which can be made into inexpensive, mass-producible pressformed articles.

The foregoing objects and other object of the present invention will become more readily understandable from the following description of preferred embodiments thereof when read in connection with accompanying drawing.

DETAILED DESCRIPTION OF PREFERRED EMBODIMENTS

Figure 1:
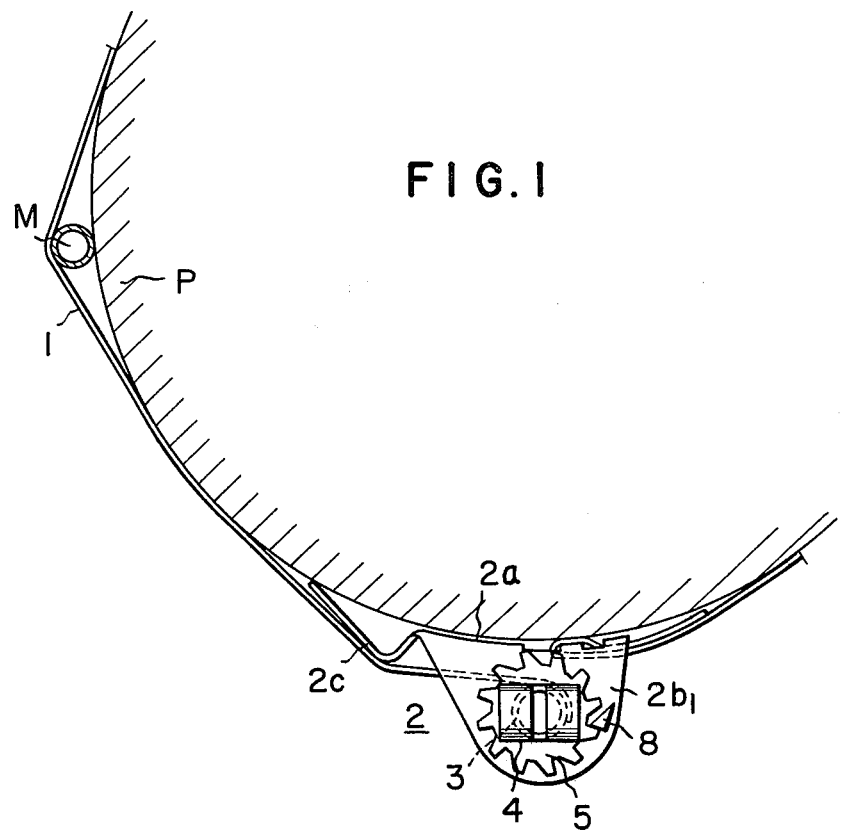
FIG. 1 is a view seen from the lower part of the band clamping device according to the present invention in its state of use.

Referring to FIG. 1, the clamping device according to the present invention for clamping, for example, electric cable tubing M along the longitudinal direction of a pole P is constructed with a flexible band 1, the main body of the clamping device 2, a band take-up shaft 3, a head part 4 of the band take-up shaft, and a return preventive ratchet wheel 5 for the band take-up shaft.

The clamping device main body 2 is constructed in such a manner that a rectangular seating plate 2a which contacts the peripheral surface of the pole P, a pair of mutually opposing support members $2b_1$ and $2b_2$ which are formed by bending both ends of the seat plate 2a in the channel-form, and a cushion member 2c extending from the lengthwise direction of the seating plate 2a and bent in the form of an inverted letter V are integrally formed by the press-shaping or molding. The opening angle $\alpha$ between the seat plate 2a and the support members $2b_1$ and $2b_2$ is made larger by approximately 1° to 2° than 90°.

The clamping device further comprises a receiving port 6 formed in each of the support members $2b_1$ and $2b_2$, band hooking slots 7a and 7b formed at appropriate positions in the seating plate 2a, an engaging pawl 8 provided at one position on either of the support members $2b_1$ or $2b_2$ (in the drawing, it is shown to be provided on the support member $2b_1$) to be engaged with the ratchet wheel 5. The pawl 8 may be formed by extrusion molding. The band take-up shaft 3 is formed by pressing a blank sheet material.

The embodiment of the band take-up shaft 3 shown in FIGS. 1 to 4 is formed in such a way that the head part 4 in the form of a substantial parallelopiped and a pair of opposing arcuate leg members 3a and 3b constituting the band take-up shaft are joined together in the form of a letter "T". A gap between the pair of arcuate leg members 3a and 3b serves as a passage, through which a clamping band is caused to pass.

The embodiment of the band take-up member 31 shown in FIGS. 5 to 10 indicates that it is shaped by press-forming a piece of blank sheet material in the form of a letter "U". In this type of the band take-up member 31, there are formed a band passing slot 10 at the bent portion of the band take-up member, and a head portion 41 which projects from one end part of the U-shaped band take-up member 31. The length $d$ of the leg portion in the U-shaped member is made equal to the diameter of the receiving port 6 for the band take-up member 31.

Figure 2:
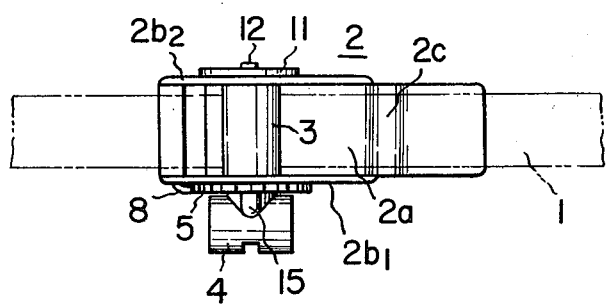
FIG. 2 is a front view of the band clamping device shown in FIG. 1 above.
Figure 3:
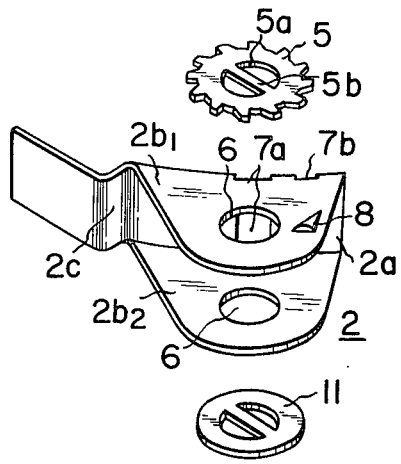
FIG. 3 is an exploded view of the band clamping device according to the present invention.
Figure 5:
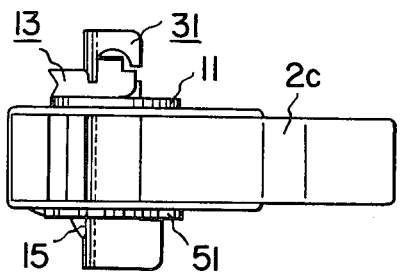
FIG. 5 is a front view of another embodiment of the band clamping device according to the present invention.
Figure 8:
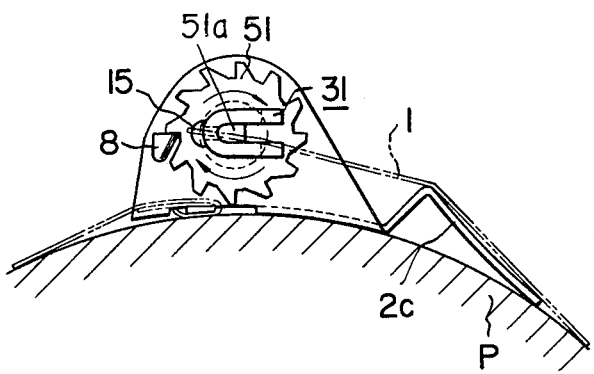
FIG. 8 is a view seen from the lower part of the band clamping device shown in FIG. 5 in its state of use.
Figure 9:
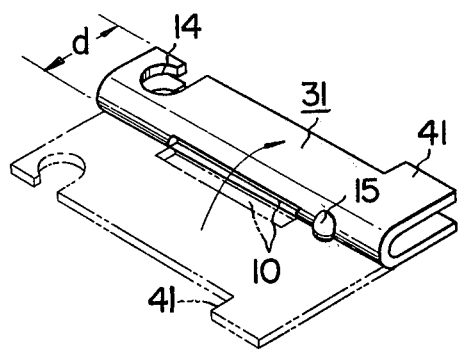
FIG. 9 is a perspective view of the band take-up shaft of the band clamping device.
Figure 10:
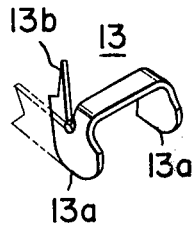
FIG. 10 is a perspective view of a cam member for fixing the band take-up shaft unmovable.

The ratchet wheel 5 cut out from a blank sheet material, in the embodiment shown in FIGS. 1 to 3, is so designed that an engagement piece 5b for the band passage groove 9 of the band take-up shaft 3 is formed in the diametrical direction of the ratchet wheel where the receiving hole 5a for the shaft is formed, which enables the shaft 3 and the ratchet wheel 5 to rotate integrally. Also, the receiving hole 51a for the shaft in the ratchet wheel 51 with respect to the U-shaped take-up member 31 shown in FIGS. 5 and 8 is so formed that it is made commensurate with the outer shape of the band take-up member 31 so that it may become integral with the ratchet wheel 51.

In the embodiment shown in FIG. 3, the band take-up shaft 3 is inserted into the shaft hole 5a of the ratchet wheel 5, then caused to pass through the receiving ports 6 of the support members $2b_1$ and $2b_2$ formed integrally with the clamping device main body 2, is fitted at its tip end with a washer 11 at the side of the support member $2b_2$, and finally caulking pieces 12 formed at the tip end of the band take-up shaft 3 are bent to fix the shaft to the support members $2b_1$ and $2b_2$.

Figure 6:
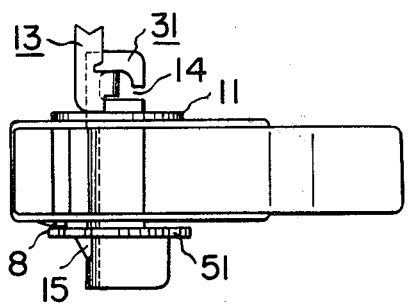
FIG. 6 is a front view showing a state wherein the band clamping device is slackened.

On the other hand, in the case of the embodiment shown in FIGS. 5 to 10, a cam 13 serving for preventing slipping of the band take-up member 31 from the clamping device main body and for clamping and loosening thereof is provided at one end part of the band take-up member 31. Then, the band take-up member 31 is clamped to the main body 2 by means of the cam surfaces 13a formed on both legs of the substantially U-shaped cam 13 inserted in the locking hole 14 of the band take-up member 31. When the cam 13 is raised by an operating pawl 13b as shown in FIG. 6, the band take-up member 31 becomes loosened. The reference numeral 15 designates a projection for stabilizing the relative setting position of the main body 2 and the band take-up member 31 which protrudes from one part of the band take-up member 31.

The clamping band 1 is cut in a length which is longer by 12 to 13 cm than the circumference of the pole P. One end of this band 1 is caused to pass through the slots 7a and 7b for several centimeters long and then bent inwardly to the peripheral surface of the pole P, while the other free end of the band is wound around the pole P and this free end is inserted into the band passage slot 9 of the band take-up shaft 3. The band 1 may be wound around the pole for any number of turn depending on necessity. When the band 1 is taken up on the band take-up shaft 3 by causing it to rotate through operation of a tool such as pinchers, screw driver, and so on, the ratchet wheel 5 also rotates, while riding over a tooth of the engagement pawl 8, whereby the ratchet tooth is engaged with the pawl 8 to automatically perform the return preventive action of the band take-up shaft 3. At this time, the support member $2b_2$ for the band take-up shaft 3 inwardly bends to relax force required for the abovementioned overriding. Also, the engagement between the engagement pawl and the ratchet wheel is non-continuous for each pitch of the ratchet teeth, and the tightening force of the clamping device between one pitch and another is adjusted by the cushion part 2c, whereby continuous clamping force is secured.

Figure 4:
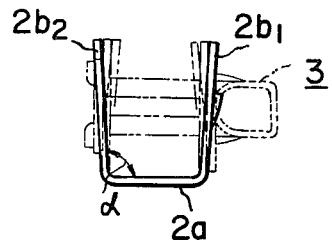
FIG. 4 is a side elevational view of the band clamping device.

In the case of releasing the return preventive engagement of the band take-up shaft which has once been clamped tight, it is possible that the engagement between the ratchet wheel 5 and the engaging pawl 8 can be made free by first grasping a pair of supporting members $2b_1$ and $2b_2$ for the band take-up shaft 3 with a tool such as pinchers, etc. to cause the same to be flexed inwardly as shown by dotted line in FIG. 4.

Figure 7:
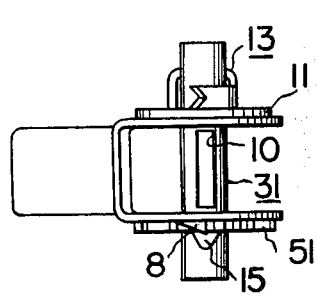
FIG. 7 is a left-side elevational view of the band clamping device shown in FIG. 5.

In the embodiment shown in FIGS. 5 to 10, the cam 13 is pulled down to the operating state as shown in FIG. 7 to perform the take-up operation by engaging the ratchet wheel 51 with the engaging pawl 8. Disengagement of the ratchet wheel 51 from the pawl 8 can be done by raising the cam 13 through the operating pawl 13b as shown in FIG. 6 to impart to the band take-up member 31 a slackening in the direction of the axial line.

In the present invention, the band clamping device main body, band take-up shaft, the ratchet wheel, and all other component parts, inter alia, the band take-up shaft, can be manufactured by press-forming metal blank sheet, or by molding synthetic resin. Accordingly, these component parts can be easily produced in an industrialized scale for mass-production from rust-preventive material such as stainless steel, etc..

In the embodiment shown in FIGS. 1 to 4, the opening angle $\alpha$ of the support members for the band take-up shaft in the clamping device main body is made slightly larger than the right angle to impart elasticity to the support members, whereby the engaging force between the ratchet wheel and the engaging pawl can be made large, and, at the time of the band take-up action, the resistance between the overriding ratchet teeth and the engaging pawl can be reduced, whereby disengagement therebetween can be done smoothly.

In the case of the embodiment in FIGS. 5 to 10, the tight clamping can be released by raising the cam.

By the compressive stress of the inverted V-shaped portion 2c of the seating plate 2b of the main body at the time of the band clamping, it becomes possible to adjust excessive tension imparted to the band accompanied by non-continuous engagement between adjacent pitches of the ratchet teeth as mentioned above, and to thereby obtain rigid clamping force. At the same time, its restitutive elasticity functions to maintain sufficient clamping force, in case the band slightly stretches or lumbers bound together by the clamping device of the present invention become thinner to a certain extent with lapse of time.

Although the present invention has been described with reference to particular embodiments thereof, they are merely illustrative and not restrictive, and that any change and modification in the whole construction of the device may be made within the purview of the present invention as recited in the appended claims.

What is claimed is:

1. A band clamping device, which comprises in combination:
   a. a U-shaped main body having a bottom part thereof to constitute a seating member, and side parts extending from said seating member in the form of a channel to constitute a pair of support members;
   b. a flexible band or strap, one end of which is folded so as to be hooked at one part of said seating member through at least one slot formed therein;
   c. a T-shaped band take-up member having a parallelopiped head part and a pair of arcuate shaft members connected at one end thereof in said head part with their concaved faces being opposed each other providing a small gap therebetween so as to be utilized as a band insertion slot, the band take-up member being rotatably held in said pair of support members;
   d. a ratchet wheel engaged with said gap between said opposing pair of the arcuate shaft members in a manner to rotate integrally with said band take-up members; and
   e. a return preventive means including an engaging pawl provided on one part of said support member and which causes the engaging pawl to be engaged with said ratchet wheel,
   the angle of bending of said support members with respect to said seating member being made greater than 90° to thereby relax the overriding resistance between said ratchet wheel and said engaging pawl formed on one part of one of said support members, and, at the same time, the opening width of said pair of support members being narrowed by compression against its elasticity to thereby release the engagement between said ratchet wheel and said engaging pawl.

2. The band clamping device as claimed in claim 1, further comprising an inverted V-shaped section provided on the extension of said seating member of the main body to increase the band clamping force by the compressive stress to be exerted thereby at the time of clamping the band.

3. A band clamping device, which comprises in combination:
   a. a U-shaped main body having a bottom part thereof to constitute a seating member, and side parts extending from said seating member in the form of a channel to constitute a pair of support members;
   b. a flexible band or strap, one end of which is folded so as to be hooked at one part of said seating member through at least one slot formed therein;
   c. a U-shaped band take-up member having an engagement projection provided at one end part thereof which serves as a head part, a small cut-away portion in a substantially circular form at the other end of the U-shaped member, and a band passage slot formed in a portion of the U-shaped member intermediate said engagement projection and said small cut-away portion;
   d. a ratchet wheel engaged with said engagement projection of said U-shaped band take-up member in a manner to rotate integrally with said band take-up member, the band take-up member being rotatably held in said pair of support members;
   e. a U-shaped cam fitted in a pivotally oscillatable manner in said small cut-away portion formed at the other end of said band take-up member, said U-shaped cam operating to fix said band take-up member inmovable in the axial direction with respect to said support members therefor by being pulled down; and
   f. a return preventive means including an engaging pawl provided on one part of said support members and which causes the engaging pawl to be engaged with said ratchet wheel,
   the angle of bending of said support members with respect to said seating member being made greater than 90° to thereby relax the overriding resistance between said ratchet wheel and said engaging pawl formed on one part of one of said support members, and at the same time, the opening width of said pair of support members being narrowed by compression against its elasticity to thereby release the engagement between said ratchet wheel and said engaging pawl.

4. The band clamping device as claimed in claim 3 wherein an inverted V-shaped section is provided on the extension of said seating member of the main body to increase the band clamping force by the compression stress to be exerted thereby at the time of clamping the band.

* * * * *